United States Patent
Fay

(10) Patent No.: US 6,797,653 B2
(45) Date of Patent: Sep. 28, 2004

(54) EQUIPMENT AND DUCT LINER INSULATION AND METHOD

(75) Inventor: Ralph Michael Fay, Lakewood, CO (US)

(73) Assignee: Johns Manville International, Inc., Denver, CO (US)

(*) Notice: Subject to any disclaimer, the term of this patent is extended or adjusted under 35 U.S.C. 154(b) by 201 days.

(21) Appl. No.: 09/966,020

(22) Filed: Sep. 28, 2001

(65) Prior Publication Data

US 2003/0068943 A1 Apr. 10, 2003

(51) Int. Cl.[7] .................. B32B 27/04; B32B 27/12; B32B 5/26; D04H 1/54
(52) U.S. Cl. .................. 442/85; 442/136; 442/364; 442/381; 442/394; 442/409; 442/414; 442/415
(58) Field of Search .................. 442/85, 136, 364, 442/381, 394, 409, 414, 415

(56) References Cited

U.S. PATENT DOCUMENTS 5,298,321 A * 3/1994 Isoda et al. .................. 442/359
5,824,973 A * 10/1998 Haines et al. .................. 181/286

* cited by examiner

Primary Examiner—Artl R. Singh
Assistant Examiner—Christopher Pratt
(74) Attorney, Agent, or Firm—Robert D. Touslee

(57) ABSTRACT

A polymeric fiber liner insulation includes of a resilient, insulation blanket core of randomly oriented entangled fibers with between 60% and 90% by weight of the fibers being standard polymeric fibers and/or flame retardant polymeric fibers and between 10% and 40% by weight of the fibers being polymeric lofting and bonding fibers. The first major surface the liner insulation has a low porosity or air and/or liquid impervious surface layer. The surface layer is formed by melting and consolidating fibers at and adjacent the first major surface of the blanket core or by coating the first major surface of the blanket core with a polymeric coating. The liner insulation exhibits a flame spread/smoke developed index of $\leq 25/50$.

14 Claims, 1 Drawing Sheet

EQUIPMENT AND DUCT LINER INSULATION AND METHOD

BACKGROUND OF THE INVENTION

The present invention relates to a resilient, liner insulation with a polymeric fiber insulation blanket core and to a method of making the resilient liner insulation. The resilient liner insulation exhibits a flame spread/smoke developed index per ASTM E-84-00a tunnel test of ≦25/50 and is especially suited for use as equipment and duct liner insulation for HVAC systems.

Glass fiber thermal and acoustical liner insulations are frequently used to line the equipment housings (the housings for air conditioning units, primary fans, etc.) and the air ducts of heating ventilating and air conditioning systems (HVAC systems) to control thermal and/or noise transmission through the walls of these housings and ducts. Glass fiber thermal and acoustical liner insulations are also frequently used to wrap or encase equipment such as dishwashers, refrigerators and other equipment where thermal and/or noise transmission must be controlled. While these glass fiber thermal and acoustical liner insulations perform very well and are quite cost effective when used for these applications, there may be certain applications where it would be desirable to use polymeric fiber liner insulations for lining equipment housings and/or ducts and for insulating appliances and other equipment.

However, to be considered for such applications, any polymeric fiber liner insulation must meet certain performance standards and be cost competitive with the glass fiber liner insulations currently being used for such applications. For use as an equipment housing liner and duct liner in HVAC systems, the polymeric fiber liner insulation should have a major surface over which the gases conveyed within the system flow (the airstream surface) that is tough, durable, puncture resistant, smooth and provided with a porosity that reduces sound transmission through the liner. The airstream surface of the liner insulation should be sufficiently tough and durable to resist puncturing and cracking when being handled prior to and during installation to thereby minimize holes on the interior surface of liner that would adversely affect the air flow through the duct and provide a location for dust, dirt particles, bacteria, mold and the like to collect. The airstream surface of the liner insulation should be sufficiently durable to resist erosion when conveying high velocity airstreams and to permit the cleaning of the airstream surface while the liner insulation is in service. The airstream surface of the liner insulation should have a porosity selected to enhance the sound absorption properties of the liner insulation and to minimize locations where dust, dirt particles, bacteria, mold and the like can collect on the airstream surface. The airstream surface of the liner insulation should be smooth to provide an efficient, low operating cost, air conditioning conveying system. In addition, for use as an equipment housing liner and duct liner in HVAC systems, the polymeric fiber liner insulation should exhibit a flame spread index of 25 or less and a smoke developed index of 50 or less as measured in accordance with the ASTM E-84-00a tunnel test (American Society for Testing and Materials E-84-00a tunnel test) entitled "Standard Test Method for Surface Burning Characteristics of Building Materials. Liner Insulations exhibiting a flame spread index of 25 or less and a smoke developed index of 50 or less, as measured in accordance with the ASTM E-84-00a tunnel test, are hereinafter referred to as having a flame spread/smoke developed index of ≦25/50.

SUMMARY OF THE INVENTION

The resilient liner insulation of the present invention meets or exceeds all of the performance criteria set forth in the background of the invention for a HVAC, equipment housing and duct liner insulation. The resilient liner insulation of the present invention includes a polymeric fiber insulation blanket core. This polymeric fiber insulation blanket core is a coherent mass of randomly oriented entangled polymeric fibers that contains between 60% and 90% by weight standard polymeric staple fibers and/or flame retardant polymeric staple fibers and between 10% and 40% by weight polymeric lofting and bonding fibers.

To minimize locations where dust, dirt particles, bacteria, mold and the like can collect on the resilient liner insulation of the present invention; to provide the resilient liner insulation of the present invention with a tough, durable, puncture resistant, smooth airstream surface for an efficient, low operating cost, air conditioning system; and to provide the resilient liner insulation of the present invention with an enhanced air flow resistance that reduces sound transmission through the liner, the resilient liner insulation of the present invention has a smooth, tough, durable, puncture resistant, low porosity airstream surface. The low porosity airstream surface of the resilient insulation liner is formed on the polymeric fiber insulation blanket core by melting and consolidating polymeric fibers at and adjacent a major surface of the insulation blanket core to form a low porosity surface layer on the major surface of the insulation blanket core or by forming a single or multilayered low porosity acrylic surface coating layer on the major surface of the insulation blanket core. Preferably, the permeability of the surface layer is selected to provide the polymeric fiber liner insulation with a higher noise reduction coefficient than an identical polymeric fiber insulation blanket without the surface layer and preferably, the surface layer of the first major surface of the liner insulation has a porosity of between 200 and 1000 Mks Rayls as measured by ASTM test C522-87.

While the polymeric fiber insulation blanket core of the resilient insulation liner of the present invention may be made with standard polymeric staple fibers and/or flame retardant polymeric staple fibers, it is preferred to form the insulation blanket core with standard polymeric staple fibers which are lower in cost than the flame retardant polymeric staple fibers. As discussed above, to be suitable for use as a HVAC equipment and duct liner insulation, liner insulation should exhibit a flame spread/smoke developed index of ≦25/50. For the resilient liner insulation of the present invention to exhibit a flame spread/smoke developed index of ≦25/50, it was initially thought that the resilient liner insulation of the present invention would require a polymeric fiber insulation blanket core having between 40% and 50% by weight flame retardant polymeric staple fibers. However, when both coated and uncoated resilient liner insulations of the present invention having about 80% by weight standard polyester staple fibers and about 20% by weight polyester lofting and bonding fibers were tested, the heat from the flame front on the low porosity major surfaces of these resilient liner insulations caused the polyester fibers at and adjacent these major surfaces to melt and shrink away from the flame front enabling the resilient liner insulations of the present invention to exhibit a flame spread/smoke developed index of ≦25/50 without the inclusion of flame retardant polymeric staple fibers.

While the resilient liner insulation of the present invention, for use as an equipment and duct liner insulation in an HVAC system, preferably, has a porous major surface designed to increase the air flow resistance through the surface and improve the noise reduction coefficient of the liner, for other applications the surface layer forming this major surface of the resilient liner insulation may be impervious to liquids and/or gases (a fluid impervious layer).

DESCRIPTION OF THE PREFERRED EMBODIMENT

Figure 1:
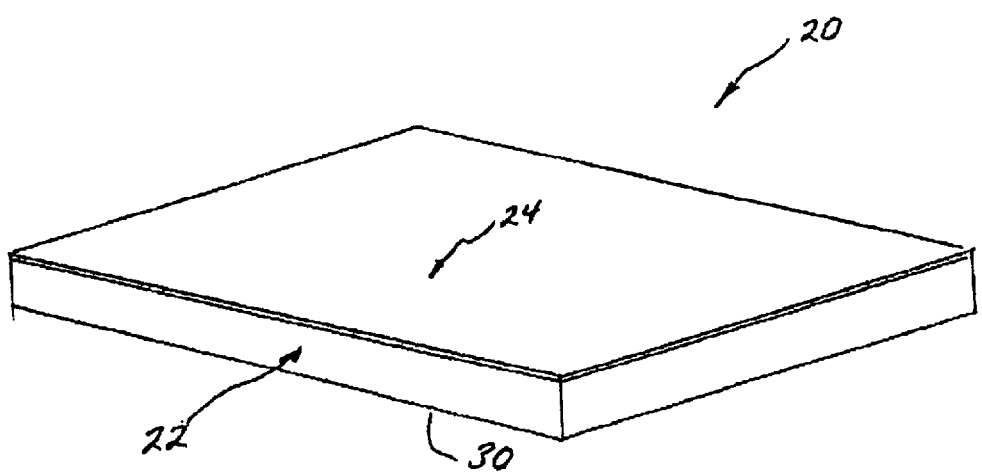
FIG. 1 is a schematic perspective view of a resilient liner insulation of the present invention with a low porosity or fluid impervious layer of melted and consolidated polymeric fibers forming one major surface of the resilient liner insulation.

The resilient liner insulation 20 of the present invention includes a resilient polymeric fiber insulation blanket core 22 and a low porosity or fluid impervious surface layer 24 that forms a major surface of the resilient liner insulation. The surface layer 24 is a solidified layer of melted core fibers. The resilient liner insulation 120 of the present invention includes a resilient polymeric fiber insulation blanket core 122 and a low porosity or fluid impervious surface layer 124 that forms a major surface of the resilient liner insulation. Preferably, for cost savings, the surface layer 124 is a single coating layer. However, optionally, for certain applications requiring such a surface layer, the surface layer 124 of the resilient liner insulation 120 may be a multilayered coating of two or more layers, e.g. layers 126 and 128. The resilient liner insulations 20 and 120 both exhibit a flame spread/smoke developed index of $\leqq 25/50$.

The insulation blanket cores 22 and 122 of the resilient liner insulations 20 and 120 are coherent, resilient masses of randomly oriented entangled polymeric fibers that contain between 60% and 90% by weight standard polymeric staple fibers and/or flame retardant polymeric staple fibers and between 10% and 40% by weight polymeric lofting and bonding fibers. In a more preferred embodiment of the invention, the insulation blanket cores 22 and 122 of the resilient liner insulations 20 and 120 contain between 70% and 80% by weight standard polymeric staple fibers and/or flame retardant polymeric staple fibers and between 20% and 30% by weight polymeric lofting and bonding fibers. The standard polymeric staple fibers and/or the flame retardant polymeric staple fibers and the lofting and bonding fibers are randomly oriented and randomly intermingled throughout the insulation blanket cores 22 and 122. The lofting and bonding fibers are bonded to the each other and to the standard polymeric staple fibers and/or the flame retardant polymeric staple fibers in the insulation blanket cores 22 and 122 at the points of intersection of the lofting and bonding fibers with other randomly oriented fibers in the insulation blanket core. Preferably, 40% to 80% by weight of the polymeric fibers in the insulation blanket cores 22 and 122 are black or dark gray in color to give the resilient liner insulations 20 and 120 the same general appearance as glass fiber liner insulations.

Preferably, the insulation blanket cores 22 and 122 have a density between about 1 pcf and 3 pcf ("pcf" means pounds per cubic foot) and the resilient liner insulations 20 and 120 have an overall thickness of about 0.5 inches or greater and generally between 0.5 and 2.0 inches. The resilient liner insulations 20 and 120 can be compressed to a thickness that is about ⅓ or less and preferably, about ⅙ or less of their initial uncompressed thickness and recover or substantially recover to their initial uncompressed thickness when the forces compressing the resilient liner insulations are released. The use of lofting and bonding fibers in the insulation blanket cores 22 and 122 in percentages by weight greater than 20% enable the resilient liner insulations 20 and 120 to recover or substantially recover to their initial uncompressed thickness after being compressed to a thickness about ⅙ or less of their initial uncompressed thickness.

Preferably, the standard polymeric staple fibers in the insulation blanket core 22 of the resilient liner insulation 20 and the insulation blanket core 122 of the resilient liner insulation 120 are thermoplastic polymeric fibers that have an average denier between 3 and 15 (the term "denier" is a unit of fineness with a 1 denier fiber weighing one gram for each 9000 meters of its length). Preferably, these standard polymeric staple fibers have an average length between 0.5 and 4.0 inches and are crimped (e.g. between 3 and 6 crimps per centimeter of length) to provide better fiber entanglement within and more loft to the insulation blanket cores 22 and 122. The preferred standard polymeric staple fibers used in the polymeric fiber insulation blanket cores 22 and 122 are standard polyester staple fibers. Standard polyester staple fibers sold by William Barnet & Son, LLC (www.barnet.com); Trevira (www.trevira.de); and KoSa (www.kosa.com) are examples of standard polyester staple fibers that may be used in the insulation blanket cores of the resilient liner insulations 20 and 120. While standard polyester staple fibers are preferred, other polymeric staple fibers may be used in the insulation blanket cores 22 and 122 of the resilient liner insulations 20 and 120, such as but not limited to melamine, phenolic or polyimide staple fibers. When used in the insulation blanket core 22 of the liner 20, the standard polymeric staple fibers must be thermoplastic to enable the formation of the surface layer 24.

Preferably, when flame retardant polymeric staple fibers are used in the insulation blanket core 22 of the resilient liner insulation 20 or the insulation blanket core 122 of the resilient insulation 120, the flame retardant polymeric staple fibers are polyester fibers. Preferably, these flame retardant polymeric staple fibers have an average denier between 3 and 15; are crimped (e.g. between 3 and 6 crimps per centimeter of length) to provide better fiber entanglement within and loft to the insulation blanket cores 22 and 122; and have an average length between 0.5 and 4.0 inches. Flame retardant polyester staple fibers sold by William Barnet & Son, LLC; Trevira; and KoSa are examples of flame retardant polyester staple fibers that may be used in the insulation blanket cores of the resilient liner insulations 20 and 120. While flame retardant polyester fibers are preferred when flame retardant polymeric staple fibers are used in the insulation blanket cores 22 and 122 of the resilient liner insulations 20 and 120, other flame retardant polymeric staple fibers may be used, such as but not limited to melamine, phenolic or polyimide flame retardant staple fibers. When used in the insulation blanket core 22 of the liner 20, the flame retardant polymeric staple fibers must be thermoplastic to enable the formation of the surface layer 24.

The polymeric lofting and bonding fibers used in the insulation blanket core 22 of the resilient liner insulation 20 and the insulation blanket core 122 of the resilient liner insulation 120 have thermoplastic surfaces with a lower temperature softening point than the softening points of either the standard polymeric staple fibers or, when used, the flame retardant polymeric staple fibers. The lofting and bonding fibers are normally sheathed fibers having a polyester core that is surrounded with a polyolefin or polyethylene teraphthalate sheath having a lower softening point but, preferably surrounded with a polyester sheath having a lower softening point than either the standard polymeric staple fibers or, when used, the flame retardant polymeric staple fibers of the insulation blanket cores 22 and 122. Polyester lofting and bonding fibers sold by KoSa under the trade designation "Celbond" are an example of polyester sheath-core bicomponent staple lofting and bonding fibers that may be used in the insulation blanket cores 22 and 122 of the liner insulations 20 and 120. When polymers of the same type, such as, polyesters, are used as the material for the sheath of the lofting and bonding fibers as well as the material for the standard polymeric staple fibers and/or the flame retardant polymeric staple fibers, the specific molecular weight of the polymer selected for the sheath of the lofting and bonding fibers is chosen to give the sheath a lower softening point than either the standard polymeric staple fibers or, when used, the flame retardant polymeric staple fibers. The lower temperature softening point of the sheath surfaces of the thermoplastic lofting and bonding fibers allows the surfaces of the lofting and bonding fibers to become tacky, when the insulation blanket cores 22 and 122 are heated, to effect the bonding of the fibers within the insulation blanket cores 22 and 122 without adversely affecting the integrity of the cores of the lofting and bonding fibers, the standard polymeric staple fibers or, when used, the flame retardant polymeric staple fibers in the insulation blanket cores. Preferably the softening point of the sheath surfaces of the lofting and bonding fibers, which is typically between 110° and 190° Centigrade, is at least 10° to 15° Centigrade lower than the softening point of either the standard polymeric staple fibers or, when used, the flame retardant polymeric staple fibers. The polymeric lofting and bonding fibers in the insulation blanket core 22 of the resilient liner insulation 20 and the insulation blanket core 122 of the resilient liner insulation 120 have an average denier between 3 and 15. Preferably, these polymeric lofting and bonding fibers have an average length between 0.5 and 4.0 inches and are crimped (e.g. between 3 and 6 crimps per centimeter of length) to provide better fiber entanglement within and more loft to the insulation blanket cores 22 and 122.

The resilient liner insulation 20 has first and second major surfaces defined by the length and the width of the resilient liner insulation. The low porosity or fluid impervious major surface of the resilient liner insulation 20 is formed by melting and consolidating polymeric fibers at and adjacent the first major surface of the insulation blanket core 22 into the low porosity or fluid impervious surface layer 24 and, subsequently, cooling the surface layer 24. This low porosity or fluid impervious surface layer 24 is coextensive with the first major surface of the resilient liner insulation 20, typically about 0.5 to about 3 millimeters thick, and is denser and less porous than the fibrous second major surface 30 of the resilient liner insulation 20 formed by the second major surface of the insulation blanket core 22.

Figure 2:
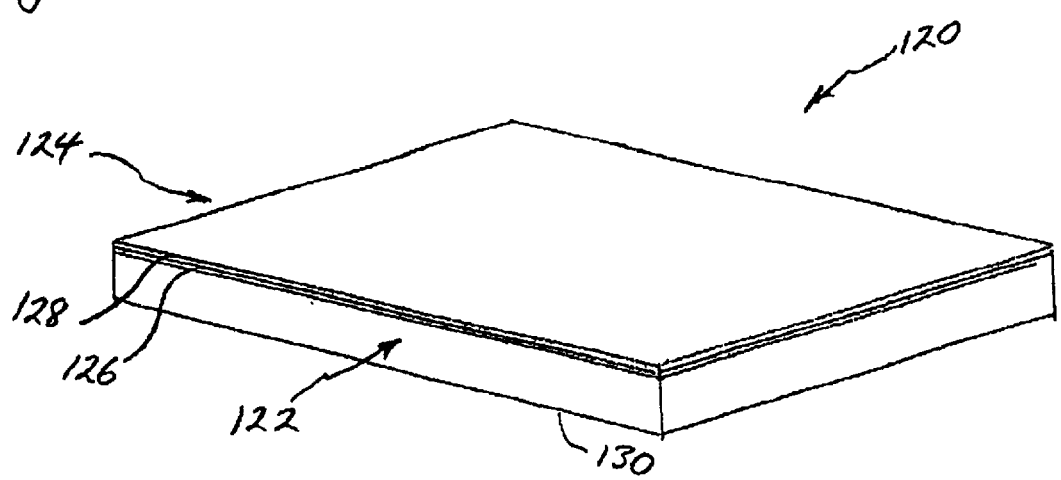
FIG. 2 is a schematic perspective view of a resilient liner insulation of the present invention with low porosity or fluid impervious coating layers forming one major surface of the resilient liner insulation.

The resilient liner insulation 120 has first and second major surfaces defined by the length and the width of the resilient liner insulation. The surface layer 124 forming the low porosity or fluid impervious major surface of the resilient liner insulation 120 may be a single layer or multilayered polymeric coating. Preferably, the surface layer 124 is a single coating layer. However, optionally for certain applications as shown in FIG. 2, the low porosity or fluid impervious major surface of the resilient liner insulation 120 is a surface layer 124 formed by two or more low porosity or fluid impervious polymeric material coating layers, e.g. layers 126 and 128, applied to a first major surface of the insulation blanket core 122. The single or multilayered, low porosity or fluid impervious surface layer 124 is coextensive with the first major surface of the resilient liner insulation 120 and is denser and less porous than the fibrous second major surface 130 of the resilient liner insulation 120 formed by the second major surface of the insulation blanket core 122. Preferably, the coating layer or layers are an acrylic coating weighing by dry weight between 8 and 20 grams per square foot and more preferably, between 10 and 14 grams per square foot.

When the resilient liner insulations 20 and 120 are used as liners for equipment housings and/or ducts in HVAC systems, the first major surfaces of the resilient liner insulations, formed by the layers 24 and 124, are the interior or airstream surfaces of the liners over which the air being conveyed within the systems flow. When used as liner insulations in HVAC systems, the layers 24 and 124 have selected porosities or permeability's to create desired airflow resistances through the interior major surfaces of the resilient liner insulations 20 and 120. These selected air flow resistances, in combination with the thicknesses and densities of the resilient insulation liners 20 or 120, increase the noise reduction coefficient of the resilient liner insulations and reduce sound transmission through the resilient liner insulations. Preferably, the surface layers 24 and 124 of the first major surfaces of the liner insulations 20 and 1120 have a porosity between 200 and 1000 Mks Rayls as measured by ASTM test C522-87. In addition, the use of these first major surfaces of the resilient liner insulations 20 and 120 as the interior surfaces of the liners minimizes locations where dust, dirt particles, bacteria, mold and the like can collect on the resilient liner insulations 20 and 120, reduces operating costs, and enables the liners to be cleaned after installation. For applications where air or water passage through the resilient insulation liners 20 and 120 is not desired, the surface layers 24 and 124 can be air and/or liquid impermeable. When the resilient liner insulations 20 and 120 are used as outside liners to wrap equipment or appliances, such as dishwashers, the first major surfaces of the liner insulations may form the outer surfaces of the resilient liner insulations. By using the first major surfaces of the resilient liner insulations 20 and 120, with their relatively smooth, higher density, non-porous, puncture resistant surfaces 24 and 124, rather than the second major surfaces of the liner insulations as the outer surfaces of the liners for these applications, equipment and appliances wrapped with the liners, such as dishwashers that must be slid into cavities under kitchen counters, can be more easily inserted into place without as easily catching on and being torn by inwardly projecting splinters, nails and other protuberances of the appliance cavity sidewalls.

In one method of forming the resilient liner insulations 20 and 120, the standard polymeric staple fibers and/or the flame retardant polymeric staple fibers and the polymeric lofting and bonding fibers are blended together in a conventional carding machine or a similar machine, such as, a RANDO-WEBBER machine made by Rando Machine Corporation of Macedon, N.Y. This mixture of pre-blended fibers, in the form of a thin veil of fibers, is then lapped back and forth transversely across a moving collection conveyor with the speed of the conveyor being regulated to obtain a series of overlapping layers of randomly oriented fibers that forms a layered fibrous insulation blanket of a desired thickness. The randomly oriented fibers of the fibrous insulation blanket predominately lie in planes parallel or substantially parallel to the major surfaces of the fibrous insulation blanket (in or substantially in X and Y axis planes). Once the layered insulation blanket of randomly oriented and randomly intermingled standard polymeric staple fibers and/or flame retardant polymeric staple fibers and polymeric lofting and bonding fibers is formed in the carding and lapping process, the layered insulation blanket is typically: a) needled and subsequently heated to about the softening point temperature of the thermoplastic surfaces of the lofting and bonding fibers; b) heated, without needling, to about the softening point temperature of the thermoplastic surfaces of the lofting and bonding fibers; or c) subjected to a fiber reorientation process to orient more of the blanket fibers in directions perpendicular or substantially perpendicular, to the major surfaces of the blanket (reorienting more of the blanket fibers in a generally Z axis direction, e.g. as shown in European Patent Office publication no. 0 434 536 B1) and, with or without needling, subsequently heated to about the softening point temperature of the thermoplastic surfaces of the lofting and bonding fibers. By heating the insulation blanket core 22 or 122 to the softening point temperature of the thermoplastic surfaces of the lofting and bonding fibers (e.g. 190° C. for several seconds), the surfaces of the lofting and bonding fibers become tacky, adhere to other fibers within the blanket at their points of intersection, and, when cooled below the softening point temperature, bond the fibers together.

When the insulation blanket core is needled, a needle punch, such as a Fehrer AG needle punch capable of up to 2500 needle punch cycles per minute may be used to perform the needling operation. The needle punch includes a lower, fixed, perforated bed plate; an upper adjustable, perforated stripper plate; and a needle board with barbed needles (preferably 36 gauge, star blade needles) depending therefrom. The needles are arranged in a preselected pattern that is the same as the hole pattern in the perforated bed and stripper plates. The bedplate supports the layers of the insulation blanket as these layers are slid over the bedplate and needled. To maintain the overlapping polymeric fiber layers and the blanket being formed from the overlapping layers in a slightly compressed state during the needle punching operation, the stripper plate is adjusted to and held at a predetermined spacing above the bed plate that is slightly less than the thickness of the overlapping layers and blanket. In operation, the needle board is driven by a conventional drive mechanism that reciprocates the needle board in a vertical direction. As the needle board is reciprocated while the overlapping polymeric fiber layers pass through the needling station, the needles of the needle board pass back and forth through the holes in the stripper plate, through the polymeric fiber layers, and into and out of the holes in the bedplate. The barbed needles thereby entangle the polymeric fibers of the overlapping polymeric fiber layers into a more coherent mass of randomly oriented polymeric fibers.

In another method of forming the insulation blanket cores 22 and 122, the blanket may be formed on a batt machine, such as a batt machine sold by Dilo System Group under the trade designation "Spinnban Turbo-Line". It is contemplated that an insulation blanket core formed on a batt machine will not require needling to increase the integrity of the insulation blanket core and that such an insulation blanket core will contain more fibers that are not oriented in planes parallel to or substantially parallel to the major surfaces of the insulation blanket cores 22 and 122 than a blanket made by the method described in the previous paragraph. After the insulation blanket cores 22 and 122 are air laid, the insulation blanket cores are heated to a temperature at least equal to the softening point temperature of the lofting and bonding fibers but less than the softening point temperature of the standard polymeric staple fibers and/or the flame retardant polymeric staple fibers, to tackify the lofting and bonding fibers which then adhere to other fibers of the blanket at their points of intersection. The insulation blanket is subsequently cooled below this temperature to bond the fibers of the insulation blanket together with the lofting and bonding fibers.

Once the insulation blanket cores 22 and 122 are formed, the smooth tough puncture resistant low porosity or fluid impermeable surfaces 24 and 124 are formed on the first major surfaces of the insulation blanket cores to complete the formation of the resilient liner insulations 20 and 120. The smooth tough puncture resistant low porosity or fluid impermeable surface is formed on the first major surface of the insulation blanket core 22 by heating, melting, and consolidating polymeric fibers in the blanket, at and adjacent the first major surface of the insulation blanket core, into a layer 24 and cooling the layer 24. The smooth tough puncture resistant low porosity or fluid impermeable surface is formed on the first major surface of the insulation blanket core 122 by coating the first major surface of the insulation blanket core 122 with one or more layers of a polymeric coating and curing the coating to form the surface layer 124.

When forming the low porosity or fluid impermeable surface layer 24 on the first major surface of the insulation blanket core 22 by heating melting and consolidating the fibers at and adjacent the first major surface of the insulation blanket core into a surface layer 24 and cooling the surface layer 24, the fibers at and adjacent the first major surface of the insulation blanket core 22 are heated by heat searing the major surface of the insulation blanket, e.g. with a flame spray, a heated roller or a heated plate. Heat searing the first major surface of the insulation blanket core 22 causes the thermoplastic polymeric fibers at and adjacent the first major surface of the insulation blanket core 22 to shrink back from the heat, melt and consolidate into a surface layer with a lower porosity, improved durability and toughness. Once the surface layer 24 is formed on insulation blanket core 22 and the layer is cooled to complete the making of the resilient liner insulation 20, the resilient liner insulation 20 is wound up or stacked and packaged for storage and shipment. The heating, melting and consolidation of the polymeric fibers at and adjacent the first major surface of the insulation blanket core 22 to form the surface layer 24 can reduce the thickness of the insulation blanket core 22 by up to one quarter of an inch. Accordingly, the insulation blanket core 22 being formed into the resilient liner insulation 20 should have an initial thickness that can accommodate the reduction in blanket thickness caused by the formation of the layer 24 and still produce resilient liner insulation 20 of the desired thickness.

When forming the low porosity or fluid impervious surface layer 124 on the insulation blanket core 122, the surface layer 124 on the resilient liner insulation 120 is a single coating layer or a multilayered coating of two or more discrete coating layers. The single or multilayered coating surface layer 124 is coextensive in width and length with a major surface of the insulation blanket core 122. Aqueous acrylic emulsions, with catalysts to initiate cross-linking of the compositions in response to the application of heat, are typical coating compositions used in the single or multilayered coating of the surface layer 124 of the resilient liner insulation 120. These coating compositions can be formulated to vary their elasticity, abrasion resistance, rigidity, density, flammability, water resistance, color, etc. These coating compositions may also include ingredients, such as but not limited to pigments, inert fillers, fire retardant particulate additives, organic or inorganic biocides, bactericides, fungicides, rheology modifiers, water repellents, surfactants and curing catalysts.

A typical froth coating used for coating the insulation blanket core 122 includes:

|  | Weight Percent |
|---|---|
| Aqueous Acrylic Latex Emulsion (Not Pressure Sensitive) | 20–90 |
| Curing Catalyst | 0.1–1.0 |
| Froth Aids | 1–10 |
| Foam Stabilizer | 1–5 |
| Mineral Filler, including Flame Retardants | 0–60 |
| Color Pigments | 0–5 |
| Rheology Control Thickener | 1–6 |
| Fungicide | 0.1–0.3 |

Final solids content is from about 20 to about 85 weight percent. The application viscosity is about 500 to about 15,000 centipoise. Froth density is measured as a "cup weight", i.e. the weight of frothed coating composition in a 16-ounce paper cup, level full. A cup weight of about 55 to about 255 grams is typical. An example of a typical black colored acrylic coating material is an acrylic coating material sold by Evode Tanner Industries, Inc., of Greenville, S.C., under the trade designation XA 9985.

When a multilayered coating surface layer 124 is used on the resilient liner insulation 120, each discrete layer of the coating can be specifically formulated to better perform a specific function. For example, the first discrete layer 126 of the coating can be formulated to be more elastic than the second discrete layer 128 to make the coating more puncture resistant while the second layer 128, which is the exposed layer, can be formulated to be more abrasion resistant than the first coating layer 126. Thus, with the multilayered coating surface layer 124 of the resilient liner insulation 120, there is the opportunity to make the coating more tear and puncture resistant to minimize damage to the coating during the packaging, shipment, handling and installation of the insulation sheets. Other examples of discrete layers which can be specifically formulated and used in the multilayered coating surface layer 124 of the resilient liner insulation 120, to provide or enhance specific performance characteristics or reduce the cost of the multilayered coating, include but are not limited to, layers formulated with biocides, layers that can fulfill a specific performance characteristic that can made of less expensive coating formulations due to their location in the multilayered coating, layers with improved water resistance, layers with reduced flammability or smoke potential.

In addition, to providing an opportunity to form different layers of the multilayered coating surface layer 124 from coating compositions having different formulations, the individual layers and of the multilayered coating surface layer 124 can be made of different weights or thicknesses to enhance a specific performance characteristic or to reduce coating costs without sacrificing performance, e.g. a discrete sublayer can be thicker than the surface layer. The multilayered coating surface layer 124 typically ranges in dry weight from about 6 to about 20 grams per square foot.

Thus, by way of example, coating layer 126 could have a dry weight of about 10-grams/sq. ft. and coating layer 128 could have a dry weight of about 4-grams/sq. ft. The preferred color of the coating for HVAC and equipment liner applications is black.

When applying a multilayered coating, the preferred method of applying the multilayered coating is disclosed in allowed U.S. patent application Ser. No. 09/312,097, filed May 14, 1999, entitled "Coated Air Duct Insulation Sheets and the Like and the Method of Coating such Sheets", which is incorporated herein by reference in its entirety. In the preferred method, a coating material of a desired composition, e.g. a cross-linkable elastomeric aqueous emulsion, in the form of a froth or foam is applied to an upper major surface of the insulation blanket core 122 by the coating applicator. This coating material is formed into the first coating layer 126 by a doctor blade or a similar thickness and surface control device, e.g. a coating roller, which spreads or distributes the coating material uniformly over the entire upper major surface of the insulation blanket core and forms a smooth exposed surface on the coating layer. The insulation blanket core 122, coated with the first coating layer 126 of the multilayered coating surface layer 124 is then passed through a heater (a heater such as an infrared heater or other heat source that, preferably, does not roughen the smooth surface characteristics imparted to the surface of the first coating layer by the doctor blade) to partially cure the coating composition of the first coating layer 126 at the exposed major surface of the first coating layer, e.g. by vaporizing a portion of the water base. By partially curing the coating composition of the first coating layer 126 at the exposed major surface of the first coating layer, the exposed major surface of the first coating layer 126 is stabilized so that the exposed major surface of the first coating layer remains smooth and the first coating layer remains discrete when the second coating layer 128 is applied to the exposed major surface of the first coating layer. In addition, with only a partial cure of the exposed major surface of the first coating layer 126, the exposed major surface of the first coating layer 126 remains tacky and forms a good bond with the second coating layer 128 when the second coating layer is applied to the exposed major surface of first coating layer.

After exiting the heater, the insulation blanket core 122, coated with the first coating layer 126 that has a stabilized but only partially cured (e.g. tacky) exposed surface passes through a second coating applicator. A coating material of a desired composition, e.g. a cross-linkable elastomeric aqueous emulsion, in the form of a froth or foam is applied to the exposed major surface of the first coating layer by the coating applicator. This second coating material is formed into the second coating layer 128 by a doctor blade or a similar thickness and surface control device, e.g. a coating roller that spreads or distributes the coating material uniformly over the entire upper major surface of the first coating layer and forms a smooth exposed surface on the coating layer. The insulation blanket core 122 with the multilayered coating surface layer 124 formed by first coating layer 126 and the second coating layer 128 is then passed through a curing oven, such as but not limited to a conventional convection oven, where the layers 126 and 128 of the multilayered coating surface layer 124 are cured by vaporizing the water base.

For an even smoother surface on the second coating layer 128 of the surface layer 124, prior to introducing the coated insulation blanket core 122 into the curing oven, the coated insulation blanket core is passed beneath a second heater.

The second heater, an infrared heat source or similar heating device which will not disturb or roughen the smooth exposed major surface of the coating layer 128, is used to at least partially cure or cure the smooth exposed major surface of the second coating layer 128 of the multilayered coating surface layer 124, e.g. by vaporizing a portion of the water base of the coating 128 at the exposed major surface of the coating layer. By at least partially curing or curing the exposed major surface of the second coating layer 128 of the multilayered coating surface layer 124 with the second heater, the exposed major surface of the coating layer 128, which has been formed with a smooth surface by the doctor blade or similar thickness and surface control device, is stabilized prior to introducing the coated insulation blanket core 122 into the curing oven. Curing ovens typically are convection ovens and, if the exposed major surface of a coating on an insulation sheet is not stabilized prior to introducing the coating into such a convection oven, the heated gas currents flowing within such curing ovens can disturb the upper or exposed major surface of a coating layer to make the exposed surface of the coating layer rougher or more uneven.

As an alternative to the second heater discussed in the previous paragraph, the second heater may be an ironing apparatus that includes a continuous smooth surfaced, metal ironing belt and a heat source, such as infrared lamps, a radiant gas burner or similar heat source, to heat the ironing belt. Like the second heater discussed in the previous paragraph, this ironing apparatus is included in the process to at least partially cure or cure the smooth exposed major surface of the second coating layer 128 of the multilayered coating surface layer 124, e.g. by vaporizing a portion of the water base of the coating 128 at the exposed major surface of the coating layer, prior to introducing the coated insulation blanket core 122 into the curing oven. However, in addition to at least partially curing or curing the smooth exposed major surface of the second coating layer 128, the heated ironing belt, which is brought into contact with the exposed major surface of the coating layer 128 and moves in the same direction and at the same speed as the coated insulation blanket core 122, may even further smooth the exposed major surface of the second coating layer 128. As with the second heater discussed in the previous paragraph, by at least partially curing or curing the exposed major surface of the second coating layer 128 of the multilayered coating surface coating 124 with the ironing apparatus, the exposed major surface of the coating layer 128 is stabilized prior to introducing the coated insulation blanket layer 122 into the curing oven. Thus, with the upper surface of the multi-layered coating surface layer 124 stabilized, any heated gas currents flowing within the curing oven can not disturb the upper or exposed major surface of a coating layer to make the surface of the coating layer 128 rougher or more uneven. An ironing apparatus like or similar to the ironing apparatuses described in U.S. Pat. No. 5,211,988, issued May 18, 1993, may be used and the disclosure of U.S. Pat. No. 5,211,988, is hereby incorporated herein in its entirety by reference.

When a single coating layer is used to form the surface layer 124, after the coating layer 126 is applied to the upper major surface of the insulation blanket core 122 as described above in connection with the multilayered coating, the coated insulation blanket core can be passed through a curing oven to cure the coating and complete the manufacture of the liner. However, preferably, the exposed surface of the coating surface layer 124 is at least partially cured or cured prior to introducing the coated insulation blanket core into the curing oven, e.g. with an ironing apparatus in the manner discussed in the immediately preceding paragraph.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A resilient, polymeric fiber liner insulation, comprising:
   a relilient insulation blanket core of polymeric fibers; the blanket core having a length and a width; the blanket core having first and second major surfaces defined by the length and width of the blanket; the blanket core having a thickness of about 0.5 inches or greater; the blanket core having a density between 1 pcf and 3 pcf; the polymeric fibers being between 60% and 90% by weight standard polymeric staple fibers and/or flame retardant polymeric staple fibers and between 10% and 40% by weight lofting and bonding polymeric fibers; the polymeric fibers having an average denier between 3 and 15; the polymeric fibers having an average length between 0.5 and 4.0 inches;
   a surface layer coextensive and integral with the first major surface of the blanket core; the surface layer of the first major surface of the blanket core being a polymeric coating that has a dry application weight of between 8 and 20 g/ft$^2$; the surface layer being less permeable than the second major surface of the blanket core; the surface layer having a porosity between 200 and 1000 Mks Rayls that provides the polymeric fiber liner insulation with a higher noise reduction coefficient than an identical polymeric fiber insulation blanket without the surface layer and that enhances the sound absorption properties of the liner insulation while maintaining a smooth surface to minimize locations where dust, dirt particles, bacteria and mold can collect; and
   the polymeric fiber liner insulation having a flame spread/smoke developed index of $\leq 25/50$.

2. The polymeric fiber liner insulation according to claim 1, wherein:
   the polymeric fiber liner insulation, after being compressed to one third or less of an initial thickness of the polymeric fiber liner insulation, substantially recovers to the initial thickness when compressive forces are released.

3. The polymeric fiber liner insulation according to claim 1, wherein:
   the polymeric coating is a multilayered polymeric coating.

4. The polymeric fiber liner insulation according to claim 1, wherein:
   the polymeric coating is an acrylic coating.

5. The polymeric fiber liner insulation according to claim 1, wherein:
   the polymeric fibers comprise between 70% and 80% by weight standard polyester staple fibers; and between 20% and 30% by weight sheathed polyester lofting and bonding fibers.

6. The polymeric fiber liner insulation according to claim 5, wherein:
   the polymeric fiber liner insulation, after being compressed to one third or less of an initial thickness of the polymeric fiber liner insulation, substantially recovers to the initial thickness when compressive forces are released.

7. The polymeric fiber liner insulation according to claim 6, wherein:
polymeric coating is a multilayered polymeric coating.

8. The polymeric fiber liner insulation according to claim 7, wherein:
the polymeric coating is an acrylic coating.

9. Resilient, polymeric fiber liner insulation, comprising:
a resilient insulation blanket core of polymeric fibers; the blanket core having a length an a width; the blanket core having first and second major surfaces defined by the length and width of the blanket; the blanket core having a thickness of about 0.5 inches or greater; the blanket core having a density between 1 pcf and 3 pcf; the polymeric bars being between 60% and 90% by weight standard polymeric staple fibers and/or flame retardant polymeric staple fibers and between 10% and 40% by weight lofting and bonding polymeric fibers; the polymeric fibers having an average denier between 3 and 15; the polymeric fibers having an average length between 0.5 and 4.0 inches;
the polymeric fibers including thermoplastic polymeric staple fibers that, at and adjacent the first major surface of the blanket core, have been melted and consolidated to form a surface layer on the first major surface of the blanket core that is coextensive and integral with the first major surface of the blanket core; the surface layer being less permeable than the second major surface of the blanket core; the the surface layer having a porosity between 200 and 1000 Mks Rayls that provides the polymeric fiber liner insulation with a higher noise reduction coefficient than an identical polymeric fiber insulation with a higher noise reduction coefficient than an identical polymeric fiber insulation blanket without the surface layer and that enhances the sound absorption properties of the inner insulation while maintaining a smooth surface to minimize locations where dust, dirt particles, bacteria and mold can collect; and
the polymeric fiber liner insulation having a flame spread/smoke developed index of $\leq 25/50$.

10. The polymeric fiber liner insulation according to claim 9, wherein:
the polymeric fiber liner insulation, after being compressed to one third or less of an initial thickness of the polymeric fiber liner insulation, substantially recovers to the initial thickness when compressive forces are released.

11. The polymeric fiber liner insulation according to claim 9, wherein:
the polymeric fibers comprise between 60% and 90% by weight standard polyester staple fibers; and between 10% end 40% by weight sheathed polyester lofting and bonding fibers.

12. The polymeric fiber liner insulation according to claim 11, wherein:
the polymeric fiber liner insulation, after being compressed to one third or less of an initial thickness of the polymeric fiber liner insulation, substantially recovers to the initial thickness when compressive forces are released.

13. The polymeric fiber liner insulation according to claim 9, wherein:
the polymeric fibers comprise between 70% and 80% by weight standard polymeric staple fibers and between 20% and 30% by weight lofting and bonding polymeric fibers.

14. The polymeric fiber liner insulation according to claim 13, wherein:
the polymeric fiber liner insulation, after being compressed to one third or less of an initial thickness of the polymeric fiber liner insulation, substantially recovers to the initial thickness when compressive forces are released.

* * * * *